United States Patent Office 3,052,514
Patented Sept. 4, 1962

3,052,514
PROCESS FOR RECOVERING URANIUM FROM AQUEOUS PHOSPHORIC ACID LIQUORS
John M. Schmitt, Oak Ridge, Tenn., assignor to the United States of America as represented by the United States Atomic Energy Commission
No Drawing. Filed June 3, 1960, Ser. No. 33,868
14 Claims. (Cl. 23—14.5)

My invention relates to processes for recovering uranium values from aqueous solutions and more particularly to an improved liquid-liquid extraction process for the recovery of uranium values.

There are several fundamentally different processes which have been employed for recovering uranium from aqueous solutions, including precipitation, ion-exchange resin sorption, and liquid-liquid extraction. Liquid-liquid extraction processes possess some advantages over the other methods; however, the usefulness of the prior art uranium extractants is limited when the aqueous solution containing the uranium values also contains significant quantities of uranium-complexing mineral acids and, in particular phosphoric acid. Attempts have been made to extract uranium values from solutions containing phosphoric acid together with uranium using an organic mixture prepared by reacting phosphorus pentoxide with an alkyl alcohol. The resulting mixture is comprised of mono- and di-alkylphosphoric acids, unreacted alcohol, pyro-, poly-, mono-, and di-alkylphosphorous acids and neutral compounds. While this mixture will extract uranium values from acidic aqueous solutions which contain phosphate ions together with the uranium, the extraction power is low. Furthermore, the mixture is not well-suited to commercial processing because: (1) the monoalkylphosphoric acids have a relatively high solubility in aqueous solutions and consequently there is a high loss of these acids to the aqueous phase; (2) there is a net build-up of alcohol in the organic phase as new reagent is added, and as the concentration of alcohol increases, the uranium extraction coefficient of the reagent decreases; and (3) alkaline stripping is not practicable because of the high aqueous solubility of the alkali and alkaline metal salts of the monoalkylphosphoric acids.

It is one object of my invention to provide an improved extractant for uranium values.

It is another object of my invention to provide a new process for extracting uranium values from acidic aqueous solutions.

It is still another object to provide a process for extracting uranium from aqueous solutions containing a relatively high concentration of phosphate ions together with said uranium values and which permits recycling the extractant.

It is still another object to provide a process for extracting uranium values from an acidic aqueous solution containing a high concentration of phosphate ions and which permits alkaline stripping of uranium values from the organic phase.

I have found that the reaction product of phosphorus pentoxide and a substantially pure dialkyl acid of phosphorus is an excellent extractant for uranium. The structure of this reaction product is not known, but data have established that in the formation of this reaction product there is a take-up of phosphorus pentoxide by the dialkyl acid, and that the ratio of phosphorus atoms to alkyl groups in this reaction product may vary from 2:3 to 3:2. Freshly made reaction product which has been prepared with an excess of phosphorus pentoxide will normally contain phosphorus and alkyl groups in a ratio of approximately 3:2, while reaction product which has been standing for several days will contain less phosphorus. A reaction product which contains phosphorus within the limits of the ratios of 2:3 to 3:2 is an excellent extractant for uranium. For the sake of convenience, this reaction product will be termed a polydialkylphosphoric acid.

In accordance with my invention I have provided a process for preparing an organic extractant for uranium comprising contacting phosphorus pentoxide with a dialkyl acid of phosphorus, said acid being represented by the formula

where $R_1$ and $R_2$ are selected from the group consisting of alkyl and alkoxy radicals.

In further accordance with my invention I have provided a process for recovering uranium values from an acidic aqueous solution containing said values together with extraneous impurities comprising contacting said solution with an organic liquid comprised of an organic diluent and said reaction product of phosphorus pentoxide and a dialkyl acid of phosphorus, whereby uranium values are transferred to the organic liquid, separating the resulting uranium-loaded organic solution from the remaining uranium-depleted aqueous liquid and recovering uranium values from said separated organic solution.

In recovering uranium in accordance with my invention, uranium can be extracted from acidic aqueous solutions with little loss of extractant to the aqueous phase, and can be extracted from aqueous solutions containing a high concentration of uranium-complexing inorganic acids. It is possible to recycle the polydialkylphosphoric acid, yet keep the uranium extraction power of this reagent at a high level. It is also possible to regenerate extraction power which may be lost through recycling by contacting the extractant with additional phosphorus pentoxide. Although the extraction power of the polydialkylphosphoric acids for uranium is high, the extraction power of this reagent for impurities commonly present in ores such as iron and aluminum is low. A high degree of purification of uranium may thus be accomplished.

The polydialkylphosphoric acid may be prepared in accordance with my invention by contacting a substantially pure dialkyl acid of phosphorus with phosphorus pentoxide.

The term "substantially pure dialkyl acid of phosphorus" is intended to refer to a dialkylphosphoric acid, dialkylphosphinic acid, or alkyl alkylphosphonic acid which is substantially free from monoalkyl acids of phosphorus such as monoalkylphosphoric acid, unreacted alcohol, non-acidic alkylphosphates, pyro and polyalkylphosphorous acids and neutral compounds, containing less than a total of two percent of these. Commercially available dialkyl acids of phosphorus, such as dialkylphosphoric acids, contain a substantially higher percent of these impurities. In the preparation of a dialkylphosphoric acid, an alkyl alcohol is reacted with phosphorous oxychloride or phosphorous pentoxide. Such preparations, and this includes most commercially available dialkylphosphoric acids, will usually contain substantial amounts of monoalkylphosphoric acids (up to 20 percent) and unreacted alcohols (up to 10 percent) in the product along with some neutral alkylphosphates and unhydrolyzed pyro- and polyphosphorous acids and neutral compounds. In making the polydialkylphosphoric acid, these compounds should be removed prior to contacting the dialkylphosphoric acid with phosphorous pentoxide. The poly- and pyrophosphoric acids and neutral compounds must be hydrolyzed to di- and monoalkylphosphoric acids by heating under reflux with an inorganic acid such as 2 M hydrochloric acid. The dialkylphosphoric acid may then be separated from the monoalkylphosphoric acid by partitioning with ethylene glycol, the monoalkylphosphoric acid being highly soluble in ethylene glycol. The alkyl alcohol and other non-acidic components (such as trialkylphosphates) are removed by partitioning them away from an aqueous solution of sodium dialkylphosphate with an inert hydrocarbon such as petroleum ether. After the alcohol and and other non-acidic components have been removed, the substantially pure dialkylphosphoric acid is reformed and recovered by acidifying the aqueous solution of sodium dialkylphosphate with a mineral acid such as hydrochloric acid.

In preparing the polydialkylphosphoric acid any dialkylphosphoric acid, dialkylphosphinic acid or alkyl alkylphosphonic acid having more than ten carbon atoms may be used. Typical suitable acids are di(n-octyl)phosphoric acid, di(3,5,5-trimethylhexyl)phosphoric acid, di(2-ethylhexyl)phosphoric acid, bis(diisobutylmethyl)phosphoric acid, di(n-octyl)phosphinic acid, di(3,5,5-trimethylhexyl)phosphinic acid, di(2-ethylhexyl)phosphinic acid, butyl hexylphosphonic acid, and 2-ethylhexyl octylphosphonic acid.

The preparation of a polydialkylphosphoric acid may be carried out by agitating an excess of solid phosphorus pentoxide with a dialkyl acid of phosphorus at room temperature. A contact time of from one to two hours is sufficient. A contact time of longer than approximately four hours lowers the extraction power of the resulting reaction product for uranium and is consequently undesirable.

A dialkyl acid of phosphorus in a concentrated form may be reacted with phosphorus pentoxide to obtain the polydialkylphosphoric acid. However, inasmuch as in a process of extracting uranium the polydialkylphosphoric acid is diluted with an organic liquid, in the preferred method of preparation the dialkyl acid of phosphorus is diluted with the organic liquid and is then contacted with phosphorus pentoxide. The organic diluent should be inert to phosphorus pentoxide, and suitable diluents are aliphatic hydrocarbons, and aromatic hydrocarbons. Because of its low cost and desirable physical properties, kerosene is preferred. The concentration of polydialkylphosphoric acid in the diluent is not critical and suitable concentrations may be obtained by reacting 1 mol of phosphorus pentoxide with a mixture containing from 0.05 to 0.5 mol of a dialkyl acid of phosphorus in one liter of a diluent. The preferred concentration is obtained by reacting 1 mol of phosphorus pentoxide with 0.1 mol of a dialkyl acid of phosphorus in one liter of a diluent.

In extracting uranium values in accordance with my invention, a polydialkylphosphoric acid, prepared as described above, and diluted with a substantially water-immiscible organic liquid, is brought into contact with a uranium-containing acidic aqueous solution.

The temperature at which the uranium-containing aqueous phase is contacted with a polydialkylphosphoric acid to extract uranium is not critical, and I prefer to carry out the extraction step at room temperature.

Although the polydialkylphosphoric acid will extract uranium from solutions containing relatively high concentrations of uranium-complexing inorganic acid anions, e.g., over approximately five molar, in the preferred form of my invention a neutral organophosphorous compound is incorporated in the organic phase, and the resulting mixture, by a synergistic effect, has an exceptionally high extraction coefficient. Suitable neutral organophosphorous compounds may be represented by the formula

where $R_3$, $R_4$ and $R_5$ are selected from the group consisting of alkyl and alkoxy radicals. Examples of suitable neutral organophosphorous compounds which may be used in my process are: tributylphosphite, tri(2-ethylhexyl)phosphite, trilaurylphosphite, tridecylphosphite, tributylphosphate, tri(2-ethylhexyl)phosphate, trioctylphosphate, tridecylphosphate, dibutylbutylphosphonate, butyldibutylphosphinate, tributylphosphine oxide, and tri(n-octyl)phosphine oxide. The preferred compounds are the trialkylphosphates. In general, suitable concentrations of the neutral organophosphorous compound are from 0.02 molar to 0.5 molar, and the preferred concentration range is from 0.5 to 0.15 molar. If an alkaline stripping agent is employed, as discussed below, the organic phase should contain the neutral organophosphorous compound in order to prevent the formation of an interfering third phase.

After the extraction step the uranium is recovered from the loaded extractant. This may be done by contacting the organic extractant with an aqueous phase containing a stripping agent, and in the preferred embodiment of my invention the uranium-bearing organic phase is contacted with an alkaline stripping agent. Both carbonates and hydroxides are suitable stripping agents, the carbonate being preferred. The carbonate may suitably be furnished as the sodium or ammonium salt. A wide range of concentrations can be used, e.g., from 0.2 molar to 1.5 molar sodium carbonate; but a concentration of 0.5 to 1.0 molar is preferred. Uranium enters the aqueous stripping solution as the uranyl tricarbonate ion and can be recovered in product form by methods well-known to the art.

If a hydroxide is used as the stripping agent, the uranium precipitates as the diuranate and can be recovered in product form by well-known methods. Sodium hydroxide and ammonium hydroxide are suitable reagents and sodium hydroxide is preferred. A wide range of concentrations can be used, e.g., from less than 0.5 molar to over 4 molar sodium hydroxide. After the organic phase has been stripped of uranium it may be sent back to the extraction stage.

Contacting the aqueous and organic phases in the extraction step and in the stripping step may be accomplished in mixer-settlers, pulse columns, or any other suitable liquid-liquid contactor.

Having thus described my invention, the following examples are offered to illustrate my invention in greater detail. Examples I–IV illustrate the low extraction power of dialkyl acids of phosphorus for uranium contained in an aqueous phosphoric acid solution, and Examples V–IX illustrate the high extraction power of the polydialkylphosphoric acids under identical conditions.

*Example I*

One hundred milliliters of a kerosene solution 0.1 molar in di(2-ethylhexyl)phosphoric acid were agitated for five minutes with 100 milliliters of an aqueous solution 5.3 molar in $H_3PO_4$ and containing 0.1 gram of hexavalent uranium. The liquids were then separated and the concentrations of uranium in the two phases were measured. The extraction coefficient, $E_a^0$, for the uranium, based on these measurements, was 0.01. The extraction coefficient, $E_a^0$, is a measure of the extraction power of a reagent and is defined as the ratio of the concentration of uranium in the organic phase to the concentration of uranium in the aqueous phase at equilibrium.

*Example II*

The experiment described in Example I was repeated using bis(diisobutylmethyl)phosphoric acid instead of di-(2-ethylhexyl)phosphoric acid. The extraction coefficient, $E_a^0$, for uranium was 0.1.

*Example III*

The experiment described in Example I was repeated, extracting quadrivalent uranium instead of hexavalent uranium. The extraction coefficient, $E_a^0$, of di(2-ethylhexyl)phosphoric acid for quadrivalent uranium in the presence of 5.3 molar $H_3PO_4$ was 0.0002.

*Example IV*

One hundred milliliters of a kerosene solution 0.1 molar in di(2-ethylhexyl)phosphoric acid and 0.1 molar in tributylphosphate were agitated for five minutes with 100 milliliters of an aqueous solution 5.3 molar in $H_3PO_4$ and containing 0.1 gram of hexavalent uranium. The two liquid phases were separated and the concentrations of uranium in the two phases were measured. The extraction coefficient, $E_a^0$, for uranium was 0.03.

Examples I–IV above illustrate the extremely low extraction power of the dialkyl acids of phosphorus and mixtures of dialkyl acids of phosphorus and neutral organophosphorus compounds for uranium values contained in an aqueous phase in the presence of high concentrations of phosphoric acid. For additional data concerning extraction of uranium values by dialkylphosphoric acids and mixtures of dialkylphosphoric acids and neutral organophosphorus compounds, reference is made to U.S. Patent No. 2,859,094, issued November 4, 1958, and entitled "Uranium Extraction Process Using Synergistic Reagents."

The following examples illustrate a method of preparation of the polydialkylphosphoric acids and the high extraction power of these reagents for uranium even in the presence of high concentrations of phosphoric acid.

*Example V*

Five grams of solid $P_2O_5$ were agitated for two hours with 100 milliliters of a kerosene solution 0.1 molar in di(2-ethylhexyl)phosphoric acid at room temperature. The resulting liquid was separated from the remaining $P_2O_5$ and mixed for 5 minutes with 100 milliliters of an aqueous solution 5.3 molar in $H_3PO_4$ and containing 0.1 gram of hexavalent uranium. The organic and aqueous phases were then separated and the concentrations of uranium in each phase were measured. The extraction coefficient, $E_a^0$, for uranium based on these measurements was 5.3.

As can be seen from a comparison of Example V with Example I, the reaction product of phosphorus pentoxide and di(2-ethylhexyl)phosphoric acid has an extraction coefficient for hexavalent uranium which is approximately 500 times greater than the di(2-ethylhexyl)phosphoric acid.

*Example VI*

One hundred milliliters of an extractant prepared from di(2-ethylhexyl)phosphoric acid in accordance with the procedure described in Example V were mixed for 5 minutes with an equal volume of an aqueous solution 5.3 molar in $H_3PO_4$ and containing 0.1 gram of quadrivalent uranium. The uranium extraction coefficient, $E_a^0$, based on measurements of the concentrations of uranium in each of the phases was 8.8.

Example VI illustrates the high extraction power of the reaction product of phosphorus pentoxide and di(2-ethylhexyl)phosphoric acid for quadrivalent uranium.

*Example VII*

A one hundred milliliter portion of an extractant prepared from di(2-ethylhexyl)phosphoric acid in accordance with the procedure described in Example V and which was made 0.1 molar in tributylphosphate was mixed for 5 minutes with 100 milliliters of an aqueous solution 5.3 molar in $H_3PO_4$ and containing 0.1 gram of quadrivalent uranium. The uranium extraction coefficient, $E_a^0$, based on measurements of the concentrations of uranium in each of the phases was 14.

Example VII illustrates the increased extraction power which results when a neutral organophosphorus compound is present in the organic phase.

*Example VIII*

Five grams of solid $P_2O_5$ were agitated at room temperature for two hours with 100 milliliters of a kerosene solution 0.1 molar in bis(diisobutylmethyl)phosphoric acid. The resulting liquid was separated from the remaining $P_2O_5$ and mixed for 5 minutes with 100 milliliters of an aqueous solution 5.3 molar in $H_3PO_4$ and containing 0.1 gram of hexavalent uranium. The organic and aqueous phases were then separated and the concentrations of uranium in each phase were measured. The extraction coefficient, $E_a^0$, for uranium was 10.

Example VIII shows the high extraction power of the reaction product of phosphorus pentoxide and bis(diisobutylmethyl)phosphoric acid.

*Example IX*

A polydialkylphosphoric acid was prepared by reacting five grams of $P_2O_5$ with 100 milliliters of a kerosene solution 0.1 molar in di(2-ethylhexyl)phosphoric acid and 0.1 molar in tributylphosphate for a period of 2 hours. The resulting liquid was separated from the remaining $P_2O_5$ and mixed for five minutes with 100 milliliters of an aqueous solution of 5.3 molar $H_3PO_4$ containing 0.1 gram of uranium. The two phases were then separated and the uranium-containing organic phase was mixed with an equal volume of an aqueous liquid 1.0 molar in $Na_2CO_3$. After five minutes of agitation the two phases were separated. An analysis of the aqueous phase established that it contained 0.09 gram of uranium. The uranium-stripped organic phase, which now contained the extraction reagent in the form of the sodium salt, was mixed for five minutes with a second 100 milliliter portion of an aqueous solution 5.3 molar in $H_3PO_4$ and containing 0.1 gram of uranium. The two phases were separated and the organic phase stripped of uranium with a second portion of an aqueous liquid 1.0 molar in $Na_2CO_3$. The amount of uranium recovered in the second stripping operation was 0.09 gram.

The above example illustrates a method of recovering uranium from the organic phase using an alkaline reagent as a stripping agent, and shows high extracting power of the sodium salt of the polydialkylphosphoric acid.

The foregoing description and examples are not intended to restrict my invention and it should be construed as limited only to the extent indicated by the appended claims.

Having thus described my invention I claim the following:

1. A process for recovering uranium values from an acidic aqueous solution containing said values together with phosphate ions in a concentration of at least about 5 molar comprising contacting said aqueous solution with an organic liquid comprised of an organic diluent and the reaction product formed by contacting for a period of not more than about four hours phosphorus pentoxide and a substantially pure dialkyl acid of phosphorus represented by the formula

where $R_1$ and $R_2$ are selected from the group consisting of alkyl and alkoxy radicals, the ratio of phosphorus atoms to the sum of alkyl and alkoxy groups in said product being from 2:3 to 3:2, whereby uranium values are transferred to the organic liquid, separating the resulting uranium-loaded organic liquid from the remaining uranium-depleted aqueous solution, and recovering uranium values from said separated organic liquid.

2. The process of claim 1 wherein said dialkyl acid of phosphorus is a dialkylphosphoric acid.

3. The process of claim 2 wherein said dialkylphosphoric acid is di(2-ethylhexyl)phosphoric acid.

4. The process of claim 2 wherein said dialkylphosphoric acid is bis(diisobutylmethyl)phosphoric acid.

5. A process for recovering uranium values from an acidic aqueous solution containing said values together with phosphate ions in a concentration of at least 5 molar which comprises contacting said aqueous solution with an organic liquid comprised of an organic diluent, a neutral organophosphorous compound represented by the formula

where $R_3$, $R_4$, and $R_5$ are selected from the group consisting of alkyl and alkoxy radicals, and the reaction product formed by contacting for a period of not more than about four hours phosphorus pentoxide and a substantially pure dialkylphosphoric acid represented by the formula

where R represents an alkoxy radical, the total number of carbon atoms in said dialkylphosphoric acid being at least ten, and the ratio of phosphorus atoms to alkoxy groups in said product being from 2:3 to 3:2, whereby uranium values are transferred to said organic liquid, separating the resulting uranium-loaded organic liquid from the remaining uranium-depleted aqueous solution, and recovering uranium values from said separated organic liquid.

6. The process of claim 5 wherein said dialkylphosphoric acid is di(2-ethylhexyl)phosphoric acid and said neutral organophosphorus compound is tributyl phosphate.

7. The process of claim 5 wherein the uranium values are recovered from said separated organic liquid by contacting said organic liquid with an alkaline aqueous liquid whereby uranium values are transferred to said aqueous liquid, separating the resulting uranium-containing aqueous liquid from the uranium-stripped organic liquid, and recovering uranium values from said uranium-containing aqueous liquid.

8. The process of claim 7 wherein said alkaline aqueous liquid contains carbonate ions.

9. A process for recovering uranium values from an aqueous solution containing said values together with phosphate ions in a concentration of at least about 5 molar comprising:

(a) contacting phosphorus pentoxide with an organic solution comprising a substantially pure dialkyl acid of phosphorus represented by the formula

where $R_1$ and $R_2$ are selected from the group consisting of alkyl and alkoxy radicals, said contact being made for a period of not more than about four hours whereby the ratio of phosphorus atoms to the sum of alkyl and alkoxy groups in the resulting reaction produce is from 2:3 to 3:2;

(b) contacting the organic solution containing said reaction product with said aqueous uranium-containing solution, whereby uranium values are extracted from said aqueous phase into said organic solution;

(c) and recovering uranium values from said organic solution.

10. The process of claim 9 wherein in step (a) said dialkyl acid of phosphorus is present in the amount of 0.05 to 0.5 mole per mole of phosphorus pentoxide.

11. The process of claim 9 wherein in step (a) said dialkyl acid of phosphorus is present in the amount of approximately 0.1 mole per mole of phosphorus pentoxide.

12. The process of claim 9 wherein in step (a) the contact of said phosphorus pentoxide and dialkyl acid of phosphorus is maintained for one to four hours.

13. The process of claim 9 wherein in step (a) said dialkyl acid of phosphorus is a dialkylphosphoric acid.

14. The process of claim 13 wherein said dialkylphosphoric acid is di(2-ethylhexyl)phosphoric acid.

References Cited in the file of this patent

UNITED STATES PATENTS

| | | |
|---|---|---|
| 2,652,426 | Stayner | Sept. 15, 1953 |
| 2,717,906 | Lecher et al. | Sept. 13, 1955 |
| 2,859,094 | Schmitt et al. | Nov. 4, 1958 |
| 2,860,031 | Grinstead | Nov. 11, 1958 |
| 2,947,774 | Levine | Aug. 2, 1960 |
| 2,958,573 | Gustison | Nov. 1, 1960 |

OTHER REFERENCES

Kosolapoff: "Organo Phosphorus Compounds," pages 339–341 (1950).

ORNL–1903, pp. 99, 100, May 13, 1955, declassified August 9, 1956.

Blake et al.: "2nd Geneva Conference on Peaceful Uses of Atomic Energy," vol. 28, pp. 289–298, September 13 1958.